United States Patent
Vieta

(10) Patent No.: US 9,411,048 B2
(45) Date of Patent: Aug. 9, 2016

(54) ELECTRONIC DEVICE WITH ADAPTIVE PROXIMITY SENSOR THRESHOLD

(75) Inventor: William Matthew Vieta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 135 days.

(21) Appl. No.: 13/599,664

(22) Filed: Aug. 30, 2012

(65) Prior Publication Data

US 2014/0062896 A1    Mar. 6, 2014

(51) Int. Cl.
| | |
|---|---|
| *G06F 1/32* | (2006.01) |
| *G01S 17/02* | (2006.01) |
| *H04M 1/725* | (2006.01) |
| *G01S 7/48* | (2006.01) |
| *H04W 52/02* | (2009.01) |

(52) U.S. Cl.
CPC ............ *G01S 17/026* (2013.01); *G01S 7/4802* (2013.01); *G06F 1/3231* (2013.01); *G06F 1/3265* (2013.01); *H04M 1/72519* (2013.01); *H04W 52/0254* (2013.01); *H04W 52/0267* (2013.01); *H04M 2250/12* (2013.01); *H04M 2250/22* (2013.01); *H04W 52/0251* (2013.01); *Y02B 60/1242* (2013.01); *Y02B 60/1289* (2013.01)

(58) Field of Classification Search
CPC ... G01S 17/026; G06F 1/3231; G06F 1/3265; H04M 1/72; H04W 52/0251
See application file for complete search history.

(56) References Cited

U.S. PATENT DOCUMENTS

| | | | |
|---|---|---|---|
| 6,211,784 B1* | 4/2001 | Nishide | 340/568.1 |
| 6,401,209 B1 | 6/2002 | Klein | |
| 7,522,065 B2* | 4/2009 | Falcon | 340/686.6 |
| 7,957,762 B2* | 6/2011 | Herz et al. | 455/550.1 |
| 2006/0060762 A1* | 3/2006 | Chan et al. | 250/221 |
| 2006/0164241 A1* | 7/2006 | Makela et al. | 340/556 |
| 2007/0075965 A1* | 4/2007 | Huppi et al. | 345/156 |
| 2007/0085157 A1* | 4/2007 | Fadell et al. | 257/428 |
| 2007/0099574 A1* | 5/2007 | Wang | 455/67.11 |
| 2008/0167834 A1 | 7/2008 | Herz et al. | |
| 2009/0207122 A1* | 8/2009 | Cheng et al. | 345/102 |
| 2010/0060611 A1 | 3/2010 | Nie | |
| 2010/0164479 A1 | 7/2010 | Alameh et al. | |
| 2012/0046906 A1 | 2/2012 | Alameh et al. | |

(Continued)

FOREIGN PATENT DOCUMENTS

| | | |
|---|---|---|
| CN | 102411425 | 4/2012 |
| DE | 102011055862 | 6/2012 |

*Primary Examiner* — Claire X Pappas
*Assistant Examiner* — Richard Hong
(74) *Attorney, Agent, or Firm* — Treyz Law Group, P.C.; G. Victor Treyz; Joseph F. Guihan

(57) ABSTRACT

An electronic device may be provided with electronic components such as a touch screen display. The touch screen display may be controlled based on information from a proximity sensor. The proximity sensor may have a light source that emits infrared light and a light detector that detects reflected infrared light. When the electronic device is in the vicinity of a user's head, the proximity sensor may produce data indicative of the presence of the user's head. Variations in proximity sensor output due to user hair color and smudges on the proximity sensor can be accommodated by using a dynamically adjustable proximity sensor data threshold in processing proximity sensor data. Proximity sensor data may be analyzed in real time to detect signal strength fluctuations that are indicative of the presence of low-reflectively dark hair on the user's head. Threshold adjustments may be based on the presence of dark hair.

19 Claims, 8 Drawing Sheets

(56) References Cited

U.S. PATENT DOCUMENTS

| | | | |
|---|---|---|---|
| 2012/0120002 A1 | 5/2012 | Ota | |
| 2012/0139877 A1* | 6/2012 | Kawabe | G06F 1/1643 345/175 |
| 2012/0162636 A1* | 6/2012 | Sy | 356/51 |
| 2012/0298869 A1* | 11/2012 | Shih et al. | 250/340 |
| 2013/0053106 A1* | 2/2013 | Kwong et al. | 455/566 |
| 2013/0120761 A1* | 5/2013 | Dyer et al. | 356/614 |

* cited by examiner

ELECTRONIC DEVICE WITH ADAPTIVE PROXIMITY SENSOR THRESHOLD

BACKGROUND

This relates generally to electronic devices and, more particularly, to electronic devices with proximity sensors.

Cellular telephones are sometimes provided with proximity sensors. For example, a cellular telephone may be provided with a proximity sensor that is located near an ear speaker on a front face of the cellular telephone.

The front face of the cellular telephone may also contain a touch screen display. The proximity sensor may be used to determine when the cellular telephone is near to the head of a user. When not in proximity to the head of the user, the cellular telephone may be placed in a normal mode of operation in which the touch screen display is used to present visual information to the user and in which the touch sensor portion of the touch screen is enabled. In response to determining that the cellular telephone has been brought into the vicinity of the user's head, the display may be disabled to conserve power and the touch sensor on the display may be temporarily disabled to avoid inadvertent touch input from contact between the user's head and the touch sensor.

A proximity sensor for use in a cellular telephone may be based on an infrared light-emitting diode and a corresponding infrared light detector. During operation, the light-emitting diode may emit infrared light outwards from the front face of the cellular telephone. When the cellular telephone is not in the vicinity of a user's head, the infrared light will not be reflected towards the light detector and only small amounts of reflected light will be detected by the light detector. When, however, the cellular telephone is adjacent to the user's head, the emitted light from the infrared light-emitting diode will be reflected from the user's head and detected by the light detector.

Light-based proximity sensors such as these may be used to detect the position of a cellular telephone relative to a user's head, but can be challenging to operate accurately. If care is not taken, it can be difficult to determine when a user's head is in the vicinity of the cellular telephone, particularly when a user has hair that is dark and exhibits low reflectivity or when the proximity sensor has become smudged with grease from the skin of the user.

It would therefore be desirable to be able to provide improved ways in which to use proximity sensors to accurately determine whether a user's head is in the vicinity of cellular telephone or other electronic device.

SUMMARY

An electronic device may be provided with electronic components such as a touch screen display. The touch screen display may be controlled based on information from a proximity sensor. For example, when the proximity sensor indicates that the electronic device is not near the head of a user, the electronic device may be operated in a normal mode in which the display is used to display images and in which the touch sensor functionality of the display is enabled. When the proximity sensor indicates that the electronic device is in the vicinity of the user's head, the electronic device may be operated in a close proximity mode in which display pixels in the display are disabled and in which the touch sensor functionality of the display is disabled.

The proximity sensor may have a light source that emits infrared light and a light detector that detects reflected infrared light. When the electronic device is in the vicinity of a user's head, the proximity sensor may produce data indicative of the presence of the user's head. Variations in proximity sensor output due to user hair color and smudges on the proximity sensor can be accommodated by using a dynamically adjustable proximity sensor data threshold in processing proximity sensor data.

Proximity sensor data may be analyzed in real time to detect signal strength fluctuations that are indicative of the presence of low-reflectively dark hair on the user's head. Threshold adjustments may then be based on the presence or absence of dark hair.

If desired, proximity sensor data may be used to invoke a voice recognition application or to trigger other suitable actions.

Further features of the invention, its nature and various advantages will be more apparent from the accompanying drawings and the following detailed description of the preferred embodiments.

DETAILED DESCRIPTION

An electronic device may be provided with electronic components such as touch screen displays. The functionality of the electronic device may be controlled based on how far the electronic device is located from external objects such as a user's head. When the electronic device is not in the vicinity of the user's head, for example, the electronic device can be operated in a normal mode in which the touch screen display is enabled. In response to detection of the presence of the electronic device in the vicinity of the user's head, the electronic device may be operated in a mode in which the touch screen is disabled or other appropriate actions are taken. Disabling touch sensing capabilities from the electronic device when the electronic device is near the user's head may help avoid inadvertent touch input as the touch sensor comes into contact with the user's ear and hair. Disabling display functions in the touch screen display when the electronic device is near the user's head may help conserve power and reduce user confusion about the status of the display.

An electronic device may use one or more proximity sensors to detect external objects. As an example, an electronic device may use an infrared-light-based proximity sensor to gather proximity data. During operation, proximity data from the proximity sensor may be compared to one or more threshold values. Based on this proximity sensor data analysis, the electronic device can determine whether or not the electronic device is near the user's head and can take appropriate action. Proximity sensor operating parameters such as proximity sensor threshold values may be adjusted dynamically to enhance proximity detection performance.

Figure 1:
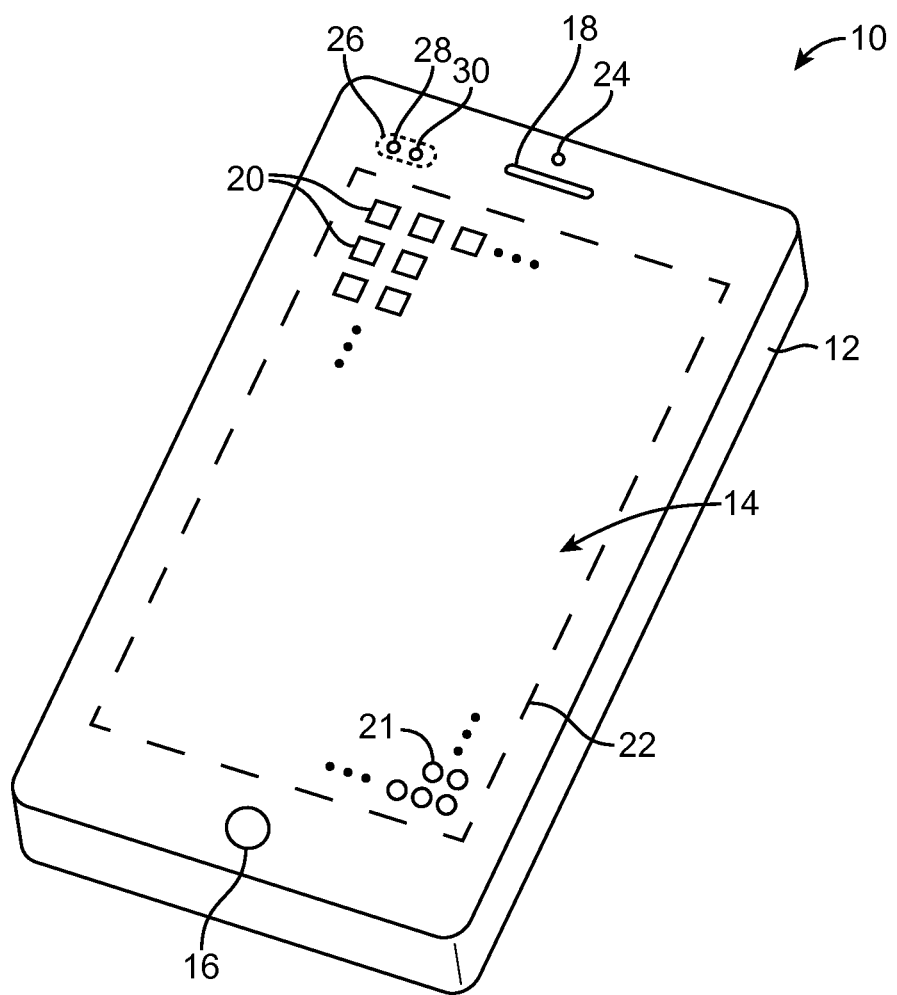
FIG. 1 is a perspective view of an illustrative electronic device with a proximity sensor in accordance with embodiments of the present invention.

An illustrative electronic device that may be provided with a proximity sensor is shown in FIG. 1. Electronic devices such as device 10 of FIG. 1 may be cellular telephones, media players, other handheld portable devices, somewhat smaller portable devices such as wrist-watch devices, pendant devices, or other wearable or miniature devices, gaming equipment, tablet computers, notebook computers, desktop computers, televisions, computer monitors, computers integrated into computer displays, or other electronic equipment.

As shown in the example of FIG. 1, device 10 may include a display such as display 14. Display 14 may be mounted in a housing such as housing 12. Housing 12 may have upper and lower portions joined by a hinge (e.g., in a laptop computer) or may form a structure without a hinge, as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes such as electrodes 20 or other touch sensor components (e.g., resistive touch sensor components, acoustic touch sensor components, force-based touch sensor components, light-based touch sensor components, etc.) or may be a display that is not touch-sensitive. Capacitive touch screen electrodes 20 may be formed from an array of indium tin oxide pads or other transparent conductive structures.

Display 14 may include an array of display pixels such as pixels 21 formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels (e.g., to increase or decrease the brightness of the image produced by display pixels 21) and thereby adjust display brightness. Display 14 may also include organic light-emitting diode pixels or other pixels with adjustable intensities. In this type of display, display brightness can be adjusted by adjusting the intensities of drive signals used to control individual display pixels.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

In the center of display 14 (e.g., in the portion of display 14 within rectangular region 22 of FIG. 1), display 14 may contain an array of active display pixels such as pixels 21. Region 22 may therefore sometimes be referred to as the active region of display 14. The rectangular ring-shaped region that surrounds the periphery of active display region 22 may not contain any active display pixels and may therefore sometimes be referred to as the inactive region of display 14. The display cover layer or other display layers in display 14 may be provided with an opaque masking layer in the inactive region to hide internal components from view by a user. Openings may be formed in the opaque masking layer to accommodate light-based components. For example, an opening may be provided in the opaque masking layer to accommodate an ambient light sensor such as ambient light sensor 24.

If desired, an opening in the opaque masking layer may be filled with an ink or other material that is transparent to infrared light but opaque to visible light. As an example, light-based proximity sensor 26 may be mounted under this type of opening in the opaque masking layer of the inactive portion of display 14. Light-based proximity sensor 26 may include a light transmitter such as light source 28 and a light sensor such as light detector 30. Light source 28 may be an infrared light-emitting diode and light detector 30 may be a photodetector based on a transistor or photodiode (as examples). During operation, proximity sensor detector 30 may gather light from source 28 that has reflected from nearby objects. Other types of proximity sensor may be used in device 10 if desired. The use of a proximity sensor that includes infrared light transmitters and sensors is merely illustrative.

Proximity sensor 26 may detect when a user's head, a user's fingers, or other external object is in the vicinity of device 10 (e.g., within 5 cm or less of sensor 26, within 1 cm or less of sensor 26, or within other suitable distance of sensor 26).

During operation of device 10, proximity sensor data from proximity sensor 26 may be used in controlling the operation of device 10. For example, when proximity sensor measurements from sensor 26 indicate that device 10 is in the vicinity of the user's head (and that the user's head is in the vicinity of device 10), device 10 can be placed in a close proximity mode. When operating in the close proximity mode, the functionality of device 10 can be altered to ensure proper operation of device 10. For example, touch screen input can be temporarily disabled so that touch events related to contact between the user's head and one or more of capacitive touch sensor electrodes 20 can be ignored. Display brightness can also be turned down partly or fully by disabling a backlight in device 10 or by otherwise temporarily disabling display pixels 21, thereby conserving power. In the event that proximity sensor data indicates that device 10 and the user's head are not adjacent to each other, (e.g., when it is determined that device 10 is more than 1 cm from the user's head, is more than 5 cm from the user's head, etc.), device 10 can be placed in a normal (non-close-proximity) operating mode.

Figure 2:
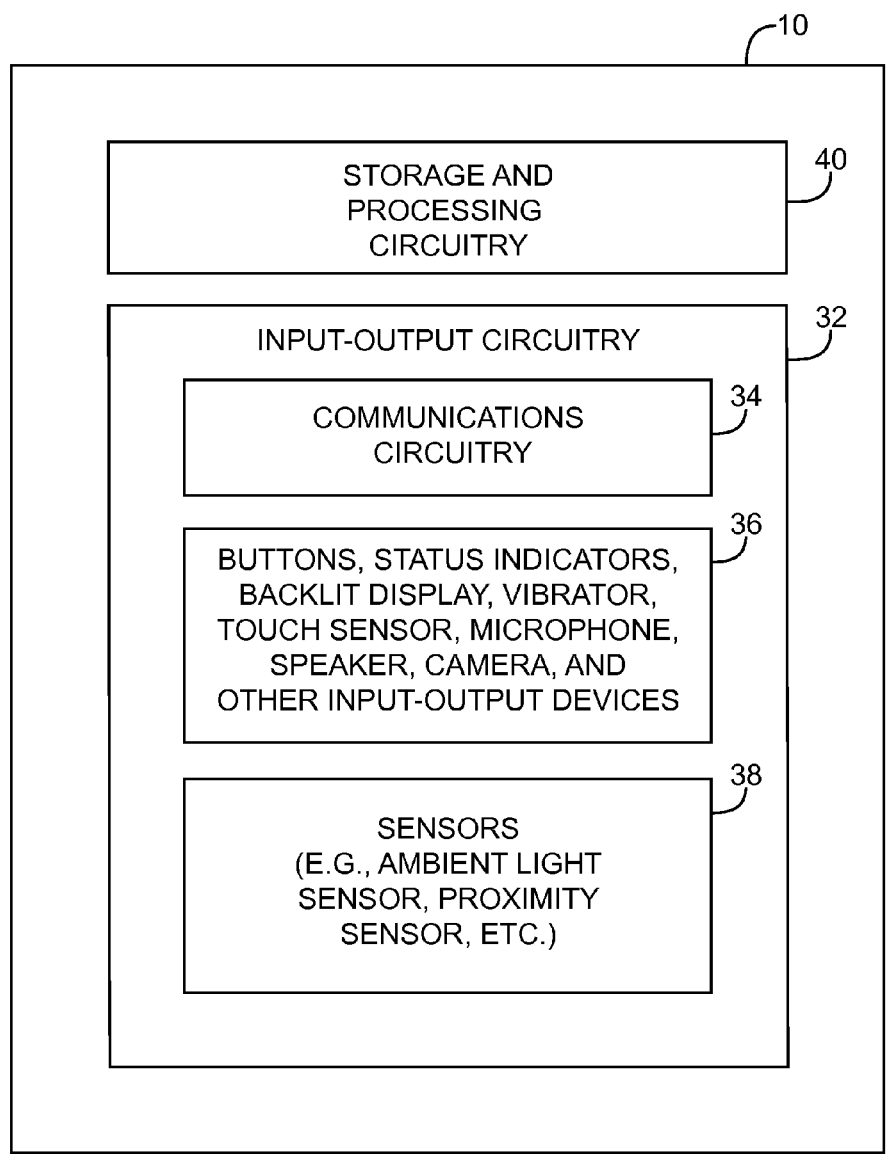
FIG. 2 is a schematic diagram of an illustrative electronic device with a proximity sensor in accordance with an embodiment of the present invention.

A schematic diagram of device 10 showing how device 10 may include sensors and other components is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on a processor such as a microprocessor and other suitable integrated circuits. With one suitable arrangement, storage and processing circuitry 40 may be used to run software on device 10, such as internet browsing applications, email applications, media playback applications, operating system functions, software for capturing and processing images, software implementing functions associated with gathering and processing sensor data, software that makes adjustments to display brightness and touch sensor functionality, etc.

Input-output circuitry 32 may be used to allow data to be supplied to device 10 and to allow data to be provided from device 10 to external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as button 16 of FIG. 1, joysticks, click wheels, scrolling wheels, a touch screen such as display 14 of FIG. 1, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user.

Sensor circuitry such as sensors 38 of FIG. 2 may include an ambient light sensor for gathering information on ambient light levels such as ambient light sensor 24. Ambient light sensor 24 may include one or more semiconductor detectors (e.g., silicon-based detectors) or other light detection circuitry. Sensors 38 may also include proximity sensor components. Sensors 38 may, for example, include a dedicated proximity sensor such as proximity sensor 26 and/or a proximity sensor formed from touch sensors 20 (e.g., a portion of the capacitive touch sensor electrodes in a touch sensor array for display 14 that are otherwise used in gathering touch input for device 10 such as the sensor electrodes in region 22 of FIG. 1). Proximity sensor components in device 10 may, in general, include capacitive proximity sensor components, infrared-light-based proximity sensor components, proximity sensor components based on acoustic signaling schemes, or other proximity sensor equipment. Sensors 38 may also include a pressure sensor, a temperature sensor, an accelerometer, a gyroscope, and other circuitry for making measurements of the environment surrounding device 10.

Sensor data such as proximity sensor data from sensors 38 may be used in controlling the operation of device 10. Device 10 can activate or inactivate display 14, may activate or inactivate touch screen functionality, may activate or inactivate a voice recognition function on device 10, or may take other suitable actions based at least partly on proximity sensor data.

Figure 3:
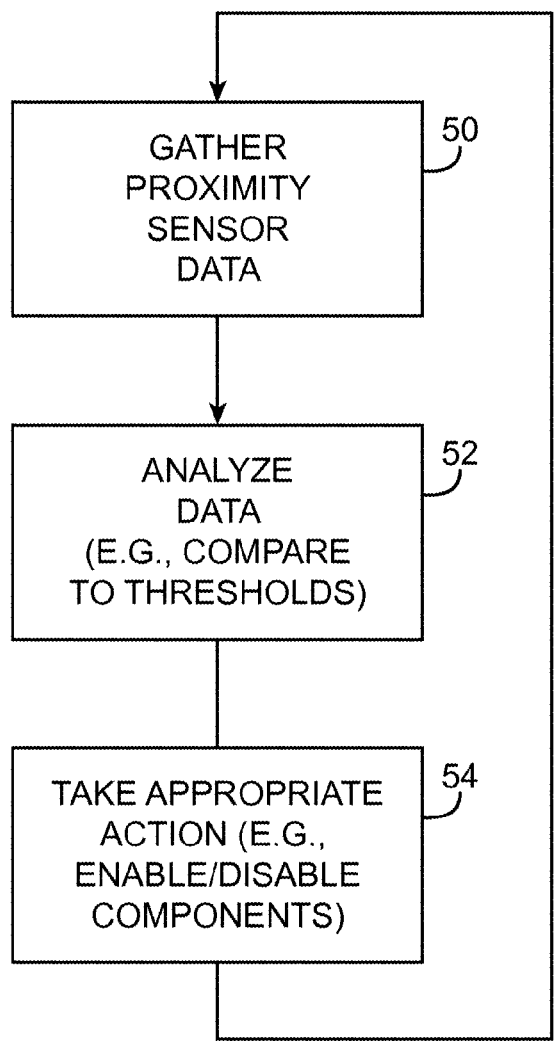
FIG. 3 is a flow chart of illustrative steps involved in taking actions in an electronic device based on proximity sensor readings in accordance with an embodiment of the present invention.

During operation of device 10, device 10 may, for example, use proximity sensor 26 to monitor the position of device 10 relative to external objects such as a user's head and can take suitable actions based on an analysis of the proximity sensor data that has been gathered. A flow chart of illustrative steps involved in gathering and using proximity sensor data in the operation of device 10 is shown in FIG. 3. As shown in FIG. 3, electronic device 10 may gather proximity sensor data during the operations of step 50. During step 50, storage and processing circuitry 40 may, for example, use a light-based proximity sensor such as proximity sensor 26 of FIG. 1 to make measurements of the amount of infrared light that has been emitted by light source 28 that has been reflected from an external object and detected by light detector 30. Measurements may be made every T seconds, where T has a value from 10 ms to 1000 ms, a value from 1 ms to 400 ms, a value of 20 ms to 200 ms, a value of more than 50 ms, or a value of less than 150 ms (as examples). Measurement data may be stored in storage in circuitry 40 (e.g., in a buffer having storage bins).

At step 52, gathered proximity sensor data may be analyzed by device 10. For example, storage and processing circuitry 40 may compare proximity sensor data that has been gathered to one or more threshold values.

At step 54, device 10 may take suitable action based on the results of the analysis operations of step 52. For example, device 10 may activate or inactivate a voice recognition feature in device 10 or other device functionality. As another example, device 10 may use storage and processing circuitry 40 to control input-output circuitry 32 such as touch sensor and/or display components based on information on whether proximity sensor readings exceeded or did not exceed proximity sensor thresholds. Time constraints (e.g., information on the time period over which threshold values were exceeded or not exceeded), time-based filtering, and other signal processing techniques may be used in analyzing proximity sensor data during the operations of step 52. Actions that may be taken at step 54 in response to the data analysis operations of step 52 may include enabling components, disabling components, adjusting the power supplied to components, or otherwise adjusting the operating parameters of input-output circuitry 32 of device 10. With one illustrative arrangement, which is sometimes described herein as an example, touch screen functionality and display output functionality may be selectively enabled and disabled based on proximity sensor information from sensor 26.

The hair of users varies in reflectivity in the infrared light spectrum. Dark (e.g., black) hair tends to absorb infrared light, rather than reflecting infrared light. Dark hair may, for example, reflect less infrared light than skin. As a result, relatively low magnitude infrared-light reflections may be measured when a dark-haired (e.g., black-haired) user places device 10 next to the user's head to make a telephone call. Smudges from finger grease or other contaminants also have the potential to affect proximity sensor readings. When a smudge is present over proximity sensor 26, more infrared light will be reflected into light detector 30 than expected.

During operation, care must be taken to avoid false negatives (e.g., situations in which the absorption of light by dark hair makes it erroneously appear as though device 10 is not in the vicinity of the user's head when it is) and false positives (e.g., situations in which the reflection of light from a smudge makes it erroneously appear as though device 10 is in the vicinity of the user's head when it is not). Dynamic adjustments to thresholds and/or other settings associated with the analysis of proximity sensor data by device 10 may be used to improve proximity sensor performance in challenging operating scenarios such as these.

Figure 4:
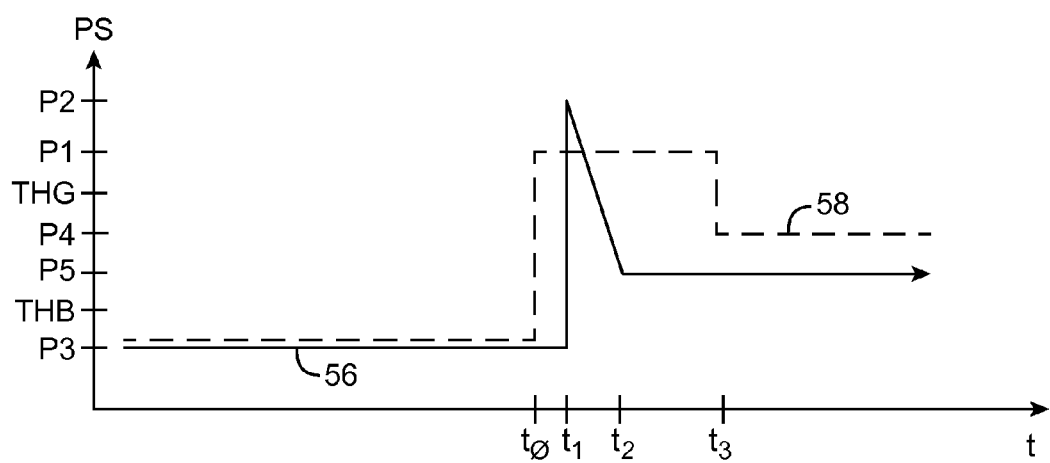
FIG. 4 is a graph showing how proximity sensor signals in an electronic device may vary as a function of time under different operating scenarios in accordance with an embodiment of the present invention.

FIG. 4 is a graph illustrating how proximity sensor data (e.g., detected reflected infrared light signal PS) may vary as a function of time t during operation of device 10 and showing how different threshold values THB and THG may be used in avoiding errors due to false positives and false negatives. Solid line 56 of FIG. 4 corresponds to an illustrative dark hair proximity sensor signal (i.e., a proximity sensor signal PS reflected from a user with dark hair). Dashed line 58 of FIG. 4 corresponds to an illustrative smudged sensor proximity sensor signal (i.e., a proximity sensor signal PS reflected from a sensor that becomes covered by a greases smudge). Threshold THX illustrates a predetermined blip detection threshold value that may be applied to proximity sensor signals to determine whether or not to analyze the sensor signals for the presence (or absence) of signal fluctuations associated with a high-to-low signal transition.

In the example represented by solid line 56 of FIG. 4, device 10 is initially being held away from the user's head. As shown by solid line 56, which corresponds to measured proximity sensor signals for a user with dark hair, reflected light signal P3 is relatively low at times before time t1, because relatively little light is reflected into light detector 30 in the absence of the user's head. At time t1, the user places device 10 against the user's head to make a telephone call. As device 10 approaches the user's head at time t1, light is reflected from the user's hair and skin and the reflected signal PS that is measured by the proximity sensor increases to level P2.

As device 10 is placed in closer proximity to the user's head at time t2, device 10 rests against the user's hair. In this position, infrared-light absorption by the dark hair of the user and the absence of significant skin reflection causes the amount of reflected light to decrease to value P5. Value P5 is relatively low relative to peak value P2, because dark hair absorbs more infrared light than skin. When light is being reflected from the user's skin as well as the user's hair at time t1, peak value P2 will be measured (in this example), but when device 10 has been brought into close proximity to the user's hair at times after time t2 so that only light reflections from the dark hair are being received, value P5 will be measured.

Dashed line 58 corresponds to measured signals when proximity sensor 26 becomes impaired by a smudge. In the scenario represented by line 58, device 10 is placed in close proximity to a user's head at time t0 and is removed from the vicinity of the user's head at time t3. During times between time t0 and t3, proximity sensor 26 becomes smudged with grease from the user's skin.

As shown by line 58, reflected light signal P3 at times before time t0 is relatively low due to the absence of the user's head in the vicinity of device 10. When the user moves device 10 near to the user's head to make a telephone call at time t0, light is reflected from the user's hair and skin and the reflected signal PS increases to level P1. At times between time t0 and time t3, device 10 is in the vicinity of the user's head so that contact with the skin of the user or other source of contamination produces a grease smudge on sensor 26. At time t3, the user removes device 10 from the vicinity of the user's head, causing the amount of reflected light to decrease to value P4. Value P4 is low relative to peak value P2, because less light is reflected towards the sensor once device 10 has been removed from the user's head. Value P4 of line 58 at times after time t3 is higher than value P5 for line 56, however, because more light is reflected back into detector 30 from light source 28 in a smudged sensor than from dark hair (in this example). Value P4 of line 58 after time t3 is higher than value P3 for line 58 before time t0, because the presence of the smudge over the sensor reflects light from light source 28 to light detector 30.

Threshold values may be used by device 10 in determining whether or not device 10 is in the vicinity of a user's head. As shown in FIG. 4, a first threshold value such as value THB may be suitable for discriminating between level P3 of curve 56 (i.e., a scenario in which device 10 is not in the vicinity of the user's head) and level P5 of curve 56 (i.e., a scenario in which device 10 is in the vicinity of a user's head that is covered with dark hair), whereas a second threshold value THG that is different than THB may be suitable for discriminating between level P1 of curve 58 (i.e., a scenario in which a device is in the vicinity of a user's head) and level P4 (a scenario in which a device with a smudged sensor is no longer in the vicinity of the user's head).

Lower threshold values such as threshold THB are helpful in ensuring that signals of level P5 on line 56 that are associated with device 10 being adjacent to the head of a dark haired user are not incorrectly identified as being associated with a situation represented by the portion of line 56 before time t0 in which device 10 is not adjacent to the head of the user. Higher threshold values such as threshold value THG are helpful in ensuring that signals of level P4 such as the signals after time t3 on line 58 that are associated with a smudged sensor device that is not adjacent to the user's head are not incorrectly identified as being associated with the portion of line 58 at level P1 between time t0 and t3 that corresponds to a situation in which device 10 is in the vicinity of the user's head.

To achieve satisfactory results over a range of different operating scenarios, threshold values may be adjusted dynamically in real time. Signal analysis operations may be performed on reflected proximity sensor signals PS at times such as the transition period associated with a decline in reflected signal power at times t2 and t3 of FIG. 4. The results of these signal analysis operations may be used to determine whether the measured proximity sensor signal exhibits characteristics of dark hair or a smudge. By distinguishing between these two scenarios using real time proximity sensor data analysis, device 10 can accurately dynamically adjust the threshold that is applied to measured sensor signal PS.

Figure 5:
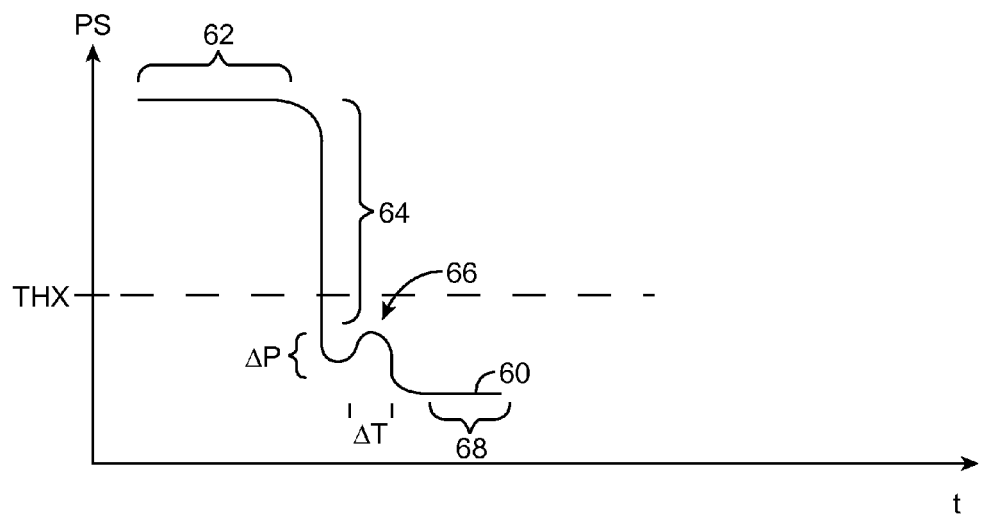
FIG. 5 is a diagram showing how a proximity sensor signal in an electronic device may operate when used in detecting the presence of a user's head with dark hair in accordance with an embodiment of the present invention.

FIG. 5 is a graph of a typical proximity sensor signal when device 10 is being used by a user with dark hair. Line 60 shows how proximity sensor signal PS changes as a function of time in a scenario in which a user is placing device 10 near to the user's head, as described in connection with line 56 of FIG. 4. During portion 62 of line 60, proximity sensor signal PS is high, because light is being reflected from the skin and hair of the user. As device 10 is placed in close proximity to the user's hair, infrared absorption in the hair may lead to decreased proximity sensor signal values, as shown by the signal strength decrease (high-to-low transition) in portion 64 of line 60. Reflections from dark hair associated with transition 64 tend to be characterized by rapid fluctuation in signal strength, as illustrated by transition signal blip 66 on line 68.

Device 10 can analyze proximity sensor data for blips when the magnitude of signal 60 has dropped below a predetermined threshold value of THX. Proximity sensor data signal blips such as blip 66 may be characterized by a magnitude variation $\Delta P$ and a time period $\Delta T$. When a signal blip such as blip 66 with characteristics such as these is detected by device 10 based on analysis of proximity sensor signal PS associated with high-to-low signal strength transition 64, device 10 can conclude that the user of device 10 has dark hair and that portion 68 of line 60 is associated with signal reflections from dark hair while device 10 is in the vicinity of the user's head.

Figure 6:
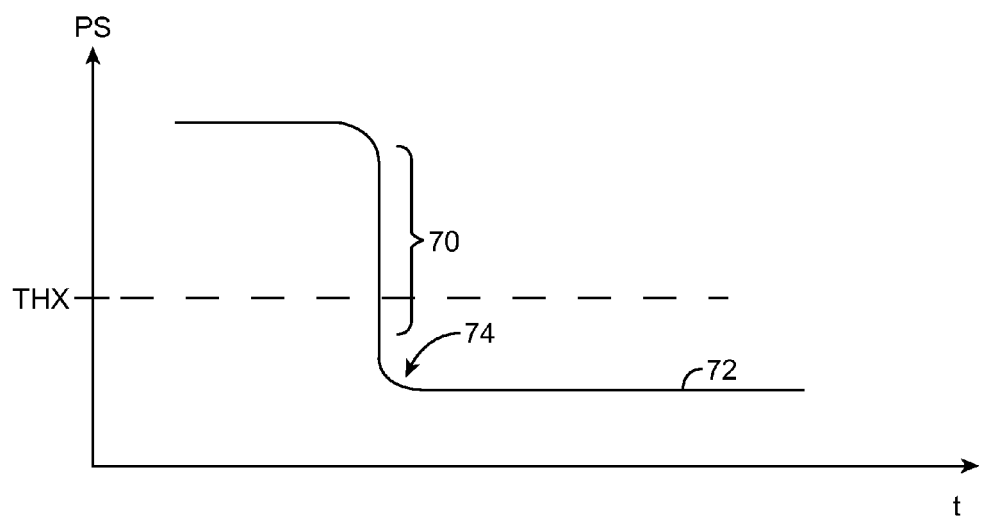
FIG. 6 is a graph showing how a proximity sensor signal in an electronic device may operate when the proximity sensor becomes smudged with grease from the skin of a user in accordance with an embodiment of the present invention.

FIG. 6 shows how measured proximity sensor signal PS may vary in a scenario in which the proximity sensor of device 10 has become smudged. In this type of situation, high-to-low signal transition 70 of proximity sensor signal 72 is free of signal fluctuations (i.e., there is no signal blip in portion 74 of signal 72 in association with transition 70).

Figure 7:
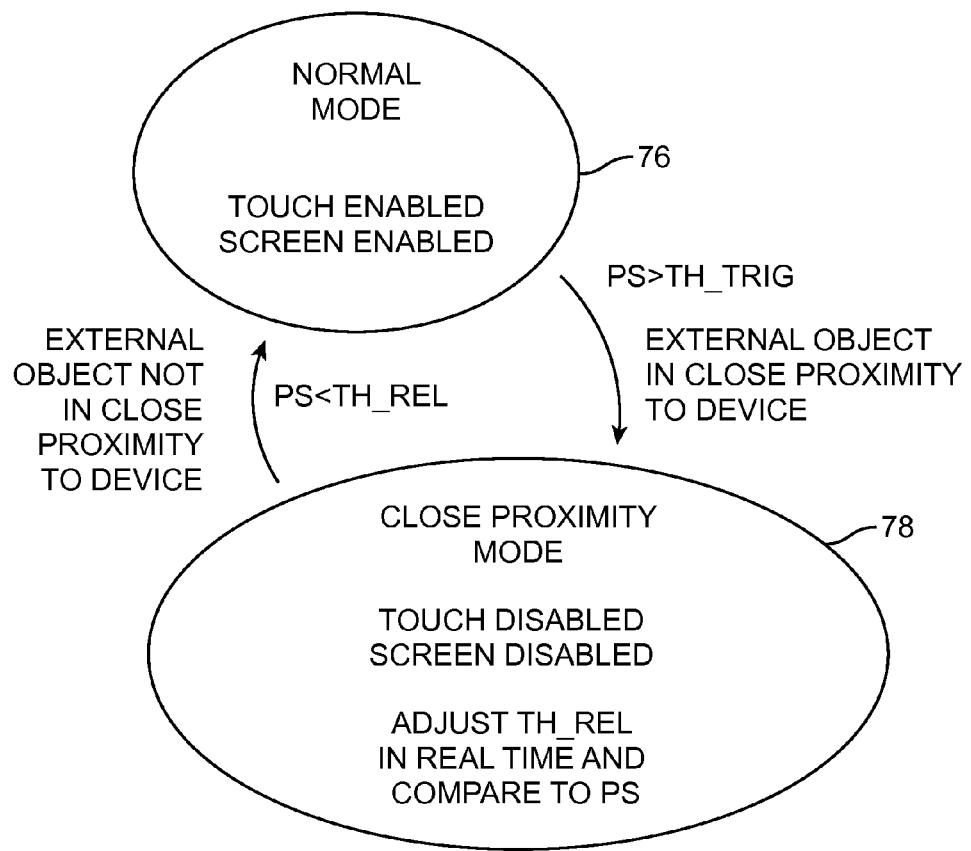
FIG. 7 is a graph showing how an electronic device may adjust display and touch sensor functionality in response to proximity sensor measurements in accordance with an embodiment of the present invention.

FIG. 7 is a flow chart illustrating how the operation of device 10 may be controlled using proximity sensor data from proximity sensor 26. At step 76, device 10 may be operated in a normal mode. For example, device 10 may be operated in a mode in which storage and processing circuitry 40 enables touch sensor operation (e.g., the operation of touch sensor electrodes 20 for touch screen display 14) and enables display 14 (e.g., by adjusting display pixels 21 so that an image is displayed for a user). During the normal mode operations of step 76, device 10 may use control circuitry 40 to gather and analyze proximity sensor data from proximity sensor 26. As an example, device 10 may compare proximity sensor signal measurements PS to a threshold value TH_TRIG to determine when an external object has been brought into the vicinity of device 10.

When PS exceeds threshold TH_TRIG, device 10 can conclude that a user has placed device 10 in the vicinity of the user's head and can therefore operate device 10 in a close proximity mode (step 78). During the operations of step 78, device 10 can take actions that are appropriate for scenarios in which device 10 is held adjacent to the head of the user. For example, control circuitry 40 may temporarily disable touch screen functionality in display 14 and/or may disable display 14 (e.g., by turning off display pixel array 21). During the operations of step 78, control circuitry 40 can analyze proximity sensor signal PS and can make corresponding dynamic adjustments in threshold value TH_REL. Threshold TH_REL may be compared to proximity sensor signal PS to determine when the external object has been removed from the vicinity of device 10. By adjusting TH_REL dynamically, device 10 may respond appropriately to measured proximity sensor data.

The example of FIG. 7 is merely illustrative. Device 10 may, in general, take any suitable action based on proximity sensor data. For example, device 10 may activate or inactivate voice recognition capabilities for device 10, may invoke one or more software programs, may activate or inactivate operating system functions, or may otherwise control the operation of device 10 in response to proximity sensor information.

Figure 8:
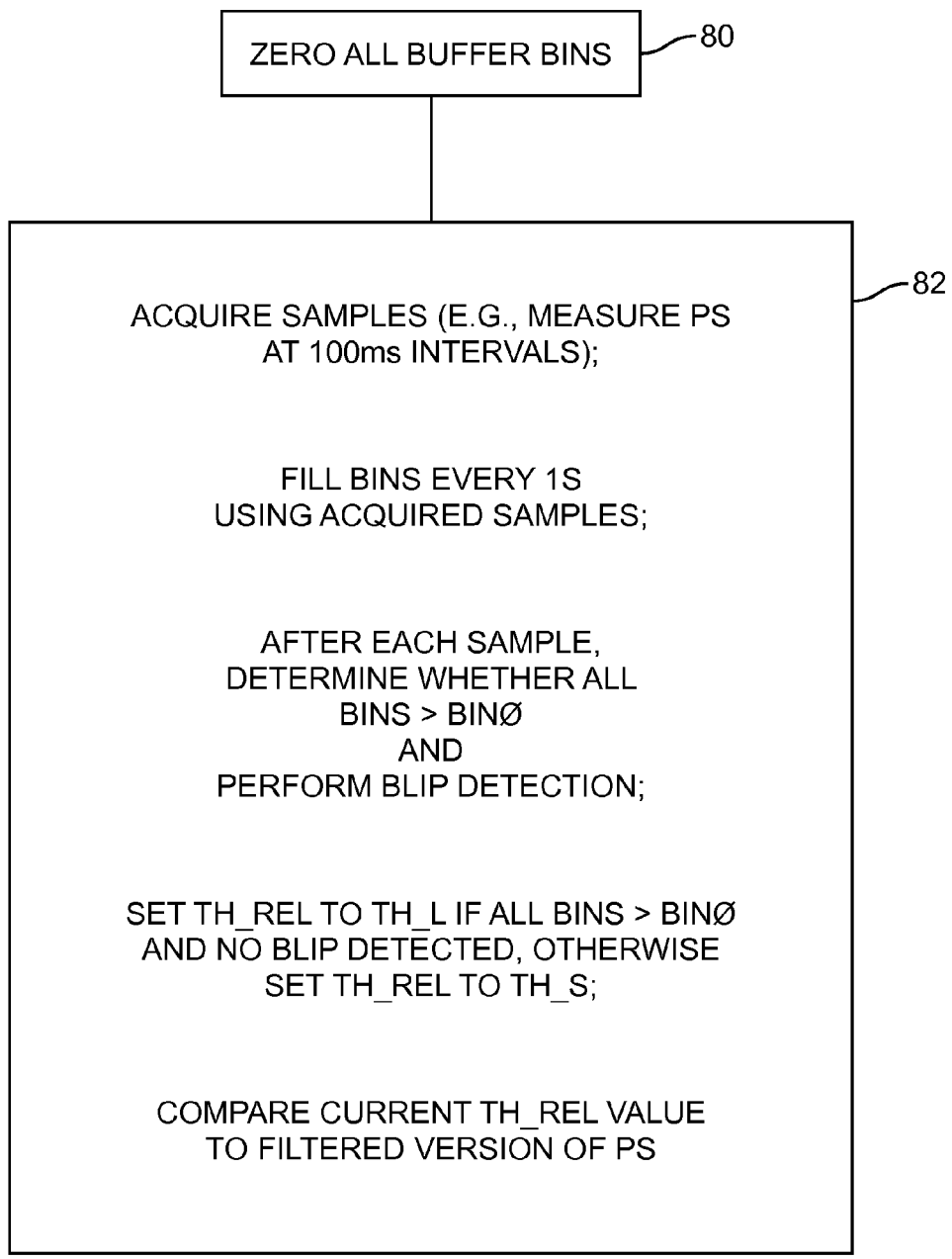
FIG. 8 is a flow chart of illustrative steps involved in dynamically adjusting a proximity sensor threshold during the operation of an electronic device in accordance with an embodiment of the present invention.

A flow chart of illustrative steps involved in performing the threshold adjustment operations of step 78 of FIG. 7 is shown in FIG. 8. Proximity sensor data may be stored in storage within control circuitry 40 such as a data buffer. The data buffer may have a number of storage locations (sometimes referred to as bins). At step 80, the contents of the data buffer may be cleared (i.e., each of the bins in the data buffer may be zeroed).

At step 82, proximity sensor data may be acquired by control circuitry 40 using proximity sensor 26. Proximity sensor readings may be acquired periodically (e.g., every 100 ms or other suitable interval). After a desired set of proximity sensor readings (e.g., 5-200 samples) has been obtained, an average value, cumulative value or other value based on the set of samples may be stored in a respective bin in the data buffer (e.g., a bin may be filled every second or other suitable time interval).

As each sample is being acquired during step 82, control circuitry 40 may analyze the stored data in the bins and may perform blip detection operations to detect proximity sensor signal level fluctuations such as fluctuation 66 of FIG. 5. Control circuitry 40 may, for example, determine whether all of the bin values in the data buffer are greater than a predetermined value (BIN0) and may determine whether or not signal fluctuations (blips) are present following the high-to-low proximity sensor signal transition of the type shown in FIGS. 5 and 6.

Step 82 also involves making adjustments to threshold TH_REL (sometimes referred to as a release threshold). If all bins have values that are greater than BIN0 and if no blip is detected, it can be concluded that the proximity sensor signal PS that has been acquired is associated with a user who does not have dark hair (i.e., a non-dark-hair user). Accordingly, device 10 may set the value of TH_REL to a value of TH_L (e.g., a relatively larger value such as value THG of FIG. 4). If all bins do not have values that are greater than BIN0 or if a blip is detected, device 10 may concluded that the user of device 10 has dark hair and may set threshold TH_REL to a TH_S (e.g., a relatively smaller value such as value THB of FIG. 4).

After dynamically adjusting threshold TH_REL in this way, device 10 may use control circuitry 40 to compare the current value of threshold TH_REL to signals PS (e.g., to a time-averaged or otherwise filtered version of signal PS). The comparison operations of step 82 may reveal whether device 10 should remain at step 78 of FIG. 7 or should transition from the close proximity mode of operation of step 78 to normal operating mode 76.

Figure 9:
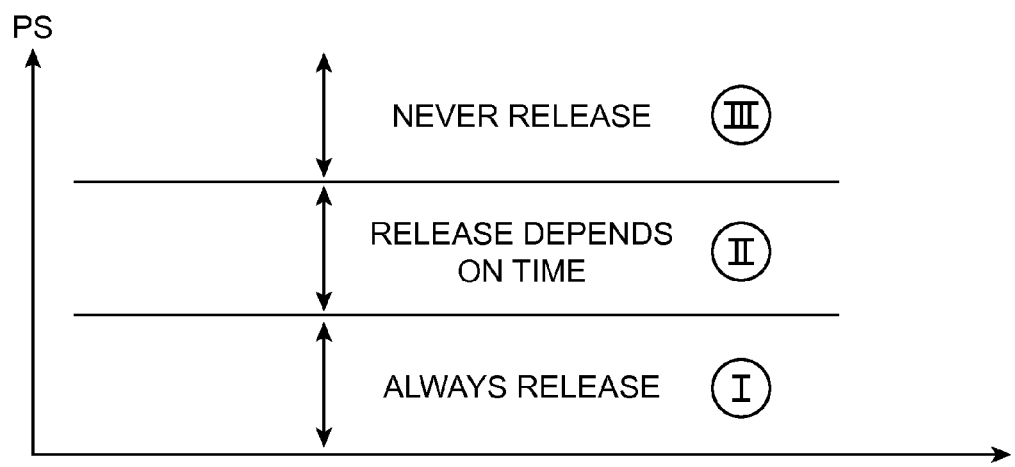
FIG. 9 is a graph showing how an electronic device may be provided with proximity sensor thresholds of different types and values in accordance with an embodiment of the present invention.

If desired, device 10 may use two or more thresholds, a combination of fixed and adjustable thresholds, or other suitable thresholds. As shown in FIG. 9, for example, device 10 may divide proximity sensor signal measurements PS into three zones (I, II, and III). When measured proximity sensor signals PS fall within zone I, device 10 may conclude that device 10 is not in the vicinity of the user's head and may therefore perform release operations such as enabling display 14 and the touch sensor array on display 14. When measured proximity sensor signals PS fall within zone III, device 10 can conclude that device 10 is in the vicinity of the user's head and can therefore suppress release operations (e.g., device 10 can maintain display 14 and its touch sensor array in a disabled configuration). The action taken by device 10 when proximity sensor signals fall within zone II may depend on the amount of time that a given signal lies within zone II (e.g., sufficient time within zone II may be required for release).

If desired, proximity data from a population of users of different hair colors (and therefore different infrared light reflection values) may be gathered and stored in a database. The database may be mined to identify proximity sensor data features such as blip characteristics that are correlated with certain types of hair (e.g., black hair). As an example, Fourier transform coefficients may be computed within predetermined time windows associated with high-to-low signal transitions.

Key features can be extracted from the database using data mining techniques. These features can be analyzed using a classification engine. As an example, a fast Fourier transform may be performed on the most recent N (e.g., 10) proximity sensor samples to produce fast Fourier transform coefficients. The coefficients can be compared to known signal features using the classification engine in real time to determine whether or not signal characteristics are present that indicate that the user of the device has dark hair.

Based on the identified hair color of the user, device 10 can make real time adjustments to a threshold value such as TH_REL. If desired, long-term history information may be maintained in device 10 and may be used to bias the results of the classification engine. With this type of approach, device 10 may learn that the most frequent user of device 10 (i.e., the owner of device 10) has (or does not have) black hair and can use this information to help in identifying the hair color of the user. Threshold values or other operating parameters may then be adjusted based on the hair color.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating an electronic device that has control circuitry, a proximity sensor, and an electronic component, comprising:
    gathering proximity sensor data with the proximity sensor;
    comparing a dynamically adjusted threshold to the gathered proximity sensor data using the control circuitry, wherein the dynamically adjusted threshold has at least first and second values, wherein the second value is configured to discriminate between a proximity sensor signal from the proximity sensor that corresponds to reflected light from a user's head and reflected light from a smudge over the proximity sensor;
    analyzing the gathered proximity data;
    adjusting the dynamically adjusted threshold based on analyzing the gathered proximity data, wherein adjusting the dynamically adjusted threshold comprises setting the dynamically adjusted threshold to either the first value or the second value; and
    based on the comparing the dynamically adjusted threshold to the gathered proximity sensor data, controlling the electronic component using the control circuitry.

2. The method defined in claim 1 wherein the electronic component comprises a touch screen display and wherein controlling the electronic component comprises disabling touch sensor functionality in the touch screen display.

3. The method defined in claim 2 wherein controlling the electronic component comprises disabling display pixels in the display.

4. The method defined in claim 1 wherein analyzing the gathered proximity data comprises performing signal fluctuation detection operations on the gathered proximity sensor data associated with a high-to-low proximity sensor signal transition to determine whether a user of the electronic device has dark hair.

5. The method defined in claim 4 wherein analyzing the gathered proximity data comprises comparing proximity data samples to a predetermined blip detection threshold value.

6. The method defined in claim 1 wherein comparing the dynamically adjusted threshold to the gathered proximity sensor data comprises determining whether an external object is in the vicinity of the electronic device.

7. The method defined in claim 1 wherein the first value is configured to discriminate between a proximity sensor signal from the proximity sensor that corresponds to reflected light from dark hair and a proximity sensor signal from the proximity sensor that corresponds to reflected light from skin, and wherein the second value is greater than the first value.

8. The method defined in claim 7 wherein the proximity sensor comprises a light source and a light detector and wherein gathering the proximity sensor data comprises gathering data from the light detector.

9. The method defined in claim 1 wherein adjusting the dynamically adjusted threshold based on analyzing the gathered proximity data comprises using the control circuitry to adjust the dynamically adjusted threshold in real time.

10. An electronic device, comprising:
    a touch screen display;
    a proximity sensor; and
    control circuitry that is configured to gather proximity sensor data with the proximity sensor and that is configured to control the touch screen display in response to comparing the proximity sensor data to a dynamically adjusted threshold value, wherein the control circuitry is configured to dynamically adjust the threshold value between a first value and a second value that is greater than the first value, wherein the control circuitry is configured to analyze high-to-low signal transitions in the proximity sensor data indicative of reflections from dark hair, and wherein the second value is configured to discriminate between a proximity sensor signal from the proximity sensor that corresponds to reflected light from a user's head and reflected light from a smudge over the proximity sensor.

11. The electronic device defined in claim 10 wherein the proximity sensor has a light source that emits infrared light and has a light detector that is configured to receive reflected portions of the emitted infrared light.

12. The electronic device defined in claim 10, wherein the first value is configured to discriminate between a proximity sensor signal from the proximity sensor that corresponds to reflected light from dark hair and a proximity sensor signal from the proximity sensor that corresponds to reflected light from skin.

13. The electronic device defined in claim 12, wherein the second value is greater than the first value.

14. A method of controlling an electronic component in an electronic device using control circuitry and proximity sensor, the method comprising:
    gathering proximity sensor data with the proximity sensor;
    dynamically adjusting a proximity sensor data threshold based on an analysis of the proximity sensor data with the control circuitry, wherein dynamically adjusting the proximity sensor data comprises adjusting the proximity data sensor threshold to a first value and adjusting the proximity data sensor threshold to a second value that is different than the first value, and wherein adjusting the proximity data sensor threshold to the second value comprises adjusting the proximity data sensor threshold to the second value to discriminate between a proximity sensor signal from the proximity sensor that corresponds to reflected light from a user's head and reflected light from a smudge over the proximity sensor;
    comparing the proximity sensor data to the dynamically adjusted proximity sensor data threshold; and
    controlling the electronic component based on the comparison of the proximity sensor data to the dynamically adjusted proximity sensor data threshold.

15. The method defined in claim 14 wherein gathering the proximity sensor data comprises storing proximity sensor data signals in bins in a data buffer implemented using the control circuitry.

16. The method defined in claim 14 further comprising:
    analyzing high-to-low transitions in the gathered proximity sensor data for signal fluctuations indicative of light reflections from dark hair, wherein dynamically adjusting the proximity sensor data threshold based on the analysis of the proximity sensor data with the control circuitry comprises adjusting the proximity sensor data threshold based on analyzing the high-to-low transitions.

17. The method defined in claim 16 wherein the electronic component comprises a display having an array of display pixels and a touch sensor and wherein controlling the electronic component comprises disabling the touch sensor in response to determining from comparing the proximity sensor data to the dynamically adjusted proximity sensor data threshold that the electronic device is in the vicinity of a head of a user of the electronic device.

18. The method defined in claim 17 wherein controlling the electronic component comprises turning off display pixels in the display in response to determining from comparing the proximity sensor data to the dynamically adjusted proximity sensor data threshold that the electronic device is in the vicinity of the head.

19. The method defined in claim 16 wherein adjusting the proximity data sensor threshold to the first value comprises adjusting the proximity data sensor threshold to the first value to discriminate between a proximity sensor signal from the proximity sensor that corresponds to reflected light from dark hair and a proximity sensor signal from the proximity sensor that corresponds to reflected light from skin.

\* \* \* \* \*